US010712492B2

(12) United States Patent
Morita et al.

(10) Patent No.: US 10,712,492 B2
(45) Date of Patent: Jul. 14, 2020

(54) OPERATING DEVICE

(71) Applicant: Sony Interactive Entertainment Inc., Tokyo (JP)

(72) Inventors: Masaho Morita, Tokyo (JP); Kazuyuki Suzuki, Kanagawa (JP)

(73) Assignee: Sony Interactive Entertainment Inc., Tokyo (JP)

(*) Notice: Subject to any disclaimer, the term of this patent is extended or adjusted under 35 U.S.C. 154(b) by 37 days.

(21) Appl. No.: 15/641,247

(22) Filed: Jul. 4, 2017

(65) Prior Publication Data
US 2018/0011242 A1 Jan. 11, 2018

(30) Foreign Application Priority Data
Jul. 11, 2016 (JP) ................. 2016-137074

(51) Int. Cl.
*G06F 3/03* (2006.01)
*F21V 8/00* (2006.01)
(Continued)

(52) U.S. Cl.
CPC .......... *G02B 6/0088* (2013.01); *A63F 13/213* (2014.09); *A63F 13/24* (2014.09);
(Continued)

(58) Field of Classification Search
CPC ..... A63F 13/24; A63F 13/213; G02B 6/0045; G02B 6/005; G02B 6/0051; G02B 6/0088;
(Continued)

(56) References Cited

U.S. PATENT DOCUMENTS 9,789,395 B2 10/2017 Igarashi
2006/0203463 A1* 9/2006 Inoue .................... G01D 11/28
362/23.12
(Continued)

FOREIGN PATENT DOCUMENTS

JP 2001358816 A 12/2001
JP 2004139983 A 5/2004
(Continued)

OTHER PUBLICATIONS

English Machine Translation of WO2013/001178 provided by ESPACENET.*
(Continued)

*Primary Examiner* — Zheng Song
(74) *Attorney, Agent, or Firm* — Matthew B. Dernier, Esq.

(57) ABSTRACT

An operating device includes a first light-emitting area provided on a front surface of the operating device, a first light-transmitting member that is formed with a material that transmits light and that makes up the first light-emitting area, a second light-emitting area provided on an upper surface of the operating device, a second light-transmitting member that is formed with a material that transmits light and that makes up the second light-emitting area, a light source, and a light guide member adapted to guide light of the light source to the first light-transmitting member and the second light-transmitting member. The light guide member includes a first guide section arranged behind the first light-transmitting member to guide light to the first light-transmitting member, and a second guide section that extends upward beyond a position of the first light-transmitting member toward the second light-transmitting member.

12 Claims, 6 Drawing Sheets

(51) Int. Cl.
  *G06F 3/0346* (2013.01)
  *A63F 13/213* (2014.01)
  *A63F 13/24* (2014.01)

(52) U.S. Cl.
  CPC ........... *G02B 6/005* (2013.01); *G02B 6/0036* (2013.01); *G02B 6/0045* (2013.01); *G02B 6/0046* (2013.01); *G02B 6/0051* (2013.01); *G02B 6/0083* (2013.01); *G06F 3/0308* (2013.01); *G06F 3/0325* (2013.01); *G06F 3/0346* (2013.01); *A63F 2300/1043* (2013.01)

(58) Field of Classification Search
  CPC .. G02B 6/0036; G02B 6/0046; G02B 6/0083; F21V 2200/15
  See application file for complete search history.

(56) References Cited

U.S. PATENT DOCUMENTS

| | | |
|---|---|---|
| 2009/0305786 A1 | 12/2009 | Chang |
| 2010/0254102 A1 | 10/2010 | Furubo |
| 2011/0011935 A1* | 1/2011 | Takahashi ............ G06K 7/0008 235/439 |
| 2013/0001307 A1* | 1/2013 | Takahashi ............ G06K 7/0008 235/437 |
| 2013/0107494 A1* | 5/2013 | Sheu ..................... G06F 1/1616 362/23.03 |
| 2014/0102869 A1* | 4/2014 | Morita .................. G06F 3/0338 200/5 R |
| 2015/0290534 A1 | 10/2015 | Igarashi |
| 2016/0209569 A1* | 7/2016 | Cho ........................ G02B 6/006 |
| 2017/0348596 A1 | 12/2017 | Igarashi |

FOREIGN PATENT DOCUMENTS

| | | | | |
|---|---|---|---|---|
| JP | 2016122454 A | | 7/2016 | |
| WO | WO2013/001178 | * | 6/2012 | ........... G02B 6/0045 |

OTHER PUBLICATIONS

Notification of Reason for Refusal for corresponding JP Application No. 2016-137074, 12 pages, dated May 22, 2018.
European Search Report for corresponding EP Application No. 17179731.9, 8 pages, dated Dec. 1, 2017.

* cited by examiner

OPERATING DEVICE

BACKGROUND

The present disclosure relates to an operating device used as an input device of an information processing apparatus such as game machine.

U.S. Patent Application Publication No. 2015/0290534 (hereinafter referred to as Patent Document 1) discloses an operating device that is used as an input device for an information processing apparatus (e.g., game machine). The operating device in Patent Document 1 has a light-emitting area on a front surface. The information processing apparatus detects the position of the operating device by acquiring light of the light-emitting area through a camera. Moreover, one of the operating devices disclosed in Patent Document 1 includes a plate-shaped operating member on an upper surface and also has a light-emitting area on this plate-shaped operating member. The light-emitting area of the upper surface employs, as a light source thereof, the light source of the light-emitting area of the front surface. Therefore, a user can find out, for example, whether or not the light-emitting area on the front surface is emitting light and what color of light is emitted from the light-emitting area on the front surface by observing light of the light-emitting area on the upper surface.

SUMMARY

The operating device of Patent Document 1 includes a light guide member that guides light of the light source to the light-emitting area on the front surface. However, if a distance from the light guide member to the light-emitting area on the upper surface is large, it is difficult to achieve high brightness of the light-emitting area on the upper surface.

It is desirable to provide an operating device that achieves high brightness in two light-emitting areas.

According to an embodiment of the present disclosure, there is provided an operating device that includes a first light-emitting area, a first light-transmitting member, a second light-emitting area, a second light-transmitting member, a light source, and a light guide member. The first light-emitting area emits light to be acquired by an external information processing apparatus through a camera and is provided on a front surface of the operating device. The first light-transmitting member is formed with a material that transmits light and makes up the first light-emitting area. The second light-emitting area is provided on an upper surface of the operating device. The second light-transmitting member is formed with a material that transmits light and makes up the second light-emitting area. The light guide member guides light of the light source to the first light-transmitting member and the second light-transmitting member. The light guide member includes a first guide section and a second guide section. The first guide section is arranged behind the first light-transmitting member to guide light to the first light-transmitting member. The second guide section extends upward beyond a position of the first light-transmitting member toward the second light-transmitting member. The present operating device makes it possible to achieve high brightness of both the first light-emitting area and the second light-emitting area.

DETAILED DESCRIPTION OF THE PREFERRED EMBODIMENT

Figure 1:
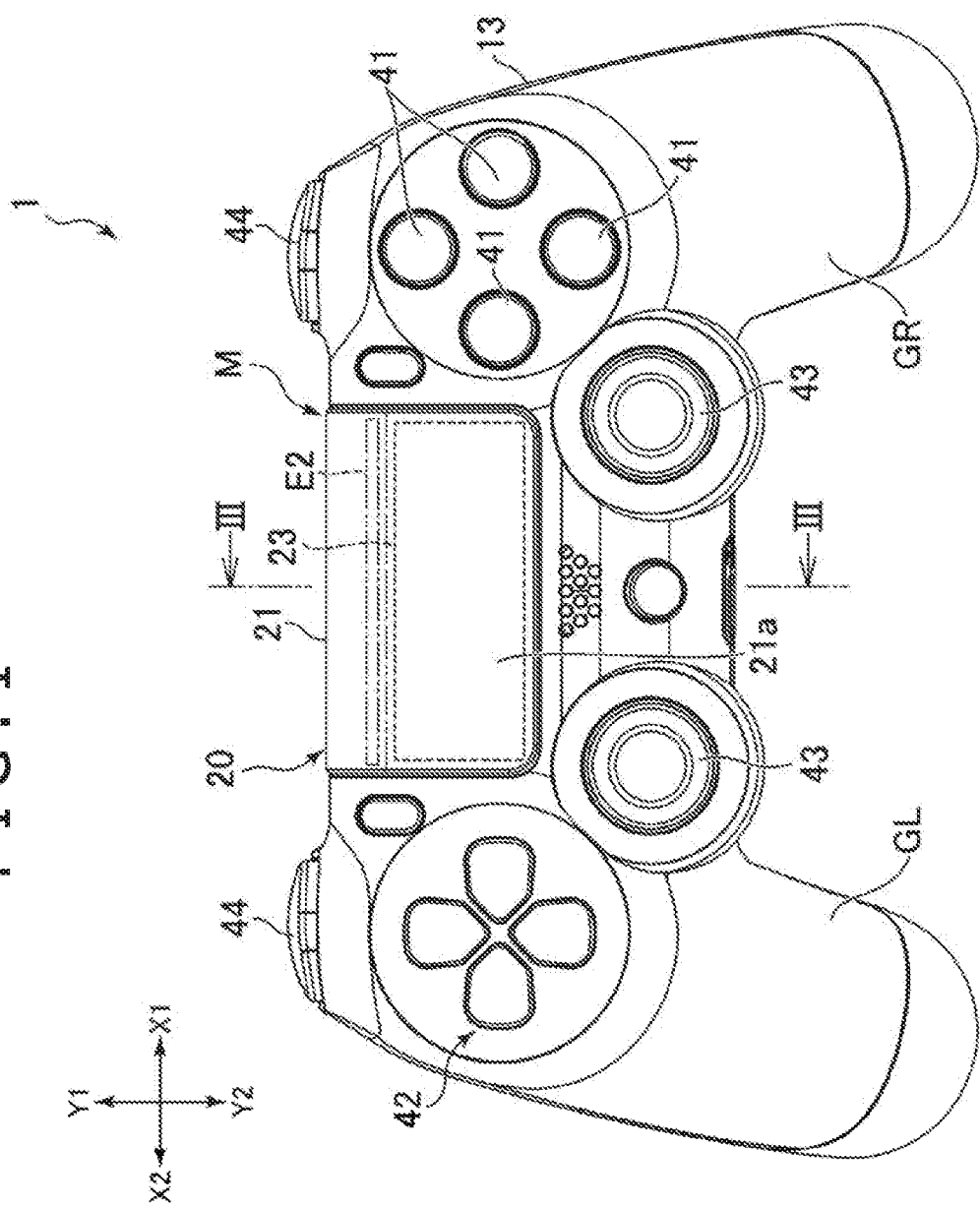
FIG. 1 is a plan view of an operating device according to an embodiment of the present disclosure.
Figure 2:
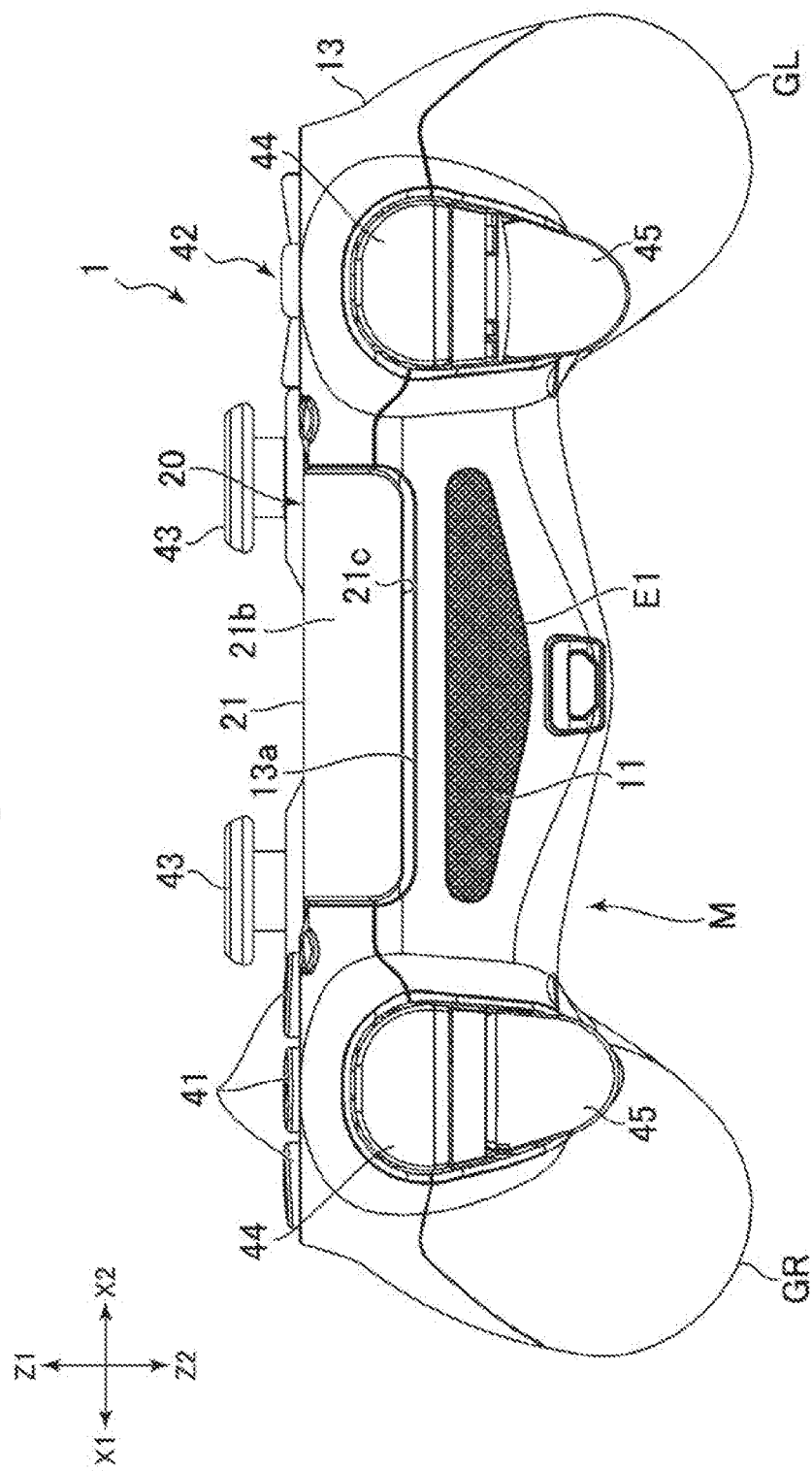
FIG. 2 is a front view of the operating device illustrated in FIG. 1.
Figure 3:
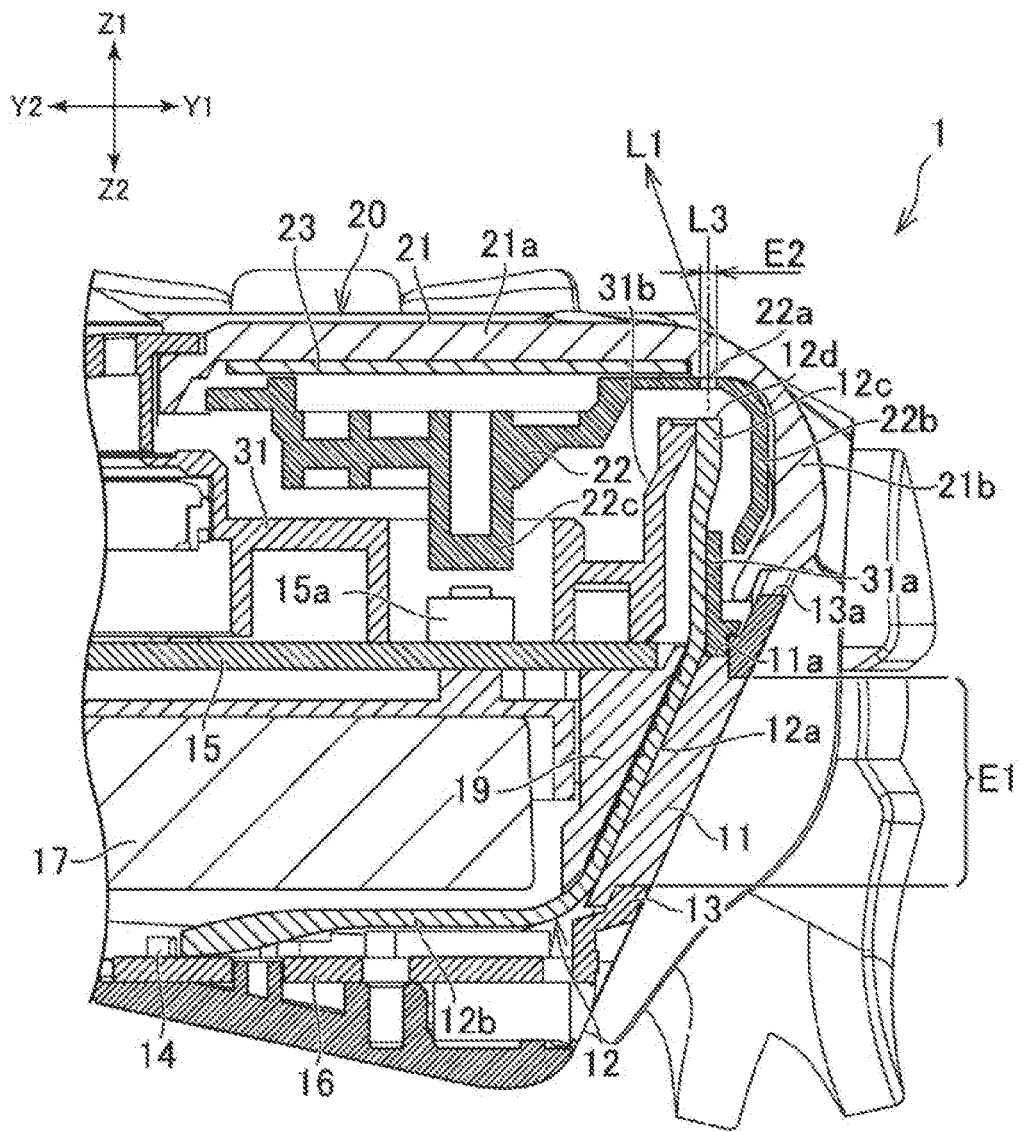
FIG. 3 is a sectional view obtained by a cutting plane shown by line III-III illustrated in FIG. 1.
Figure 4:
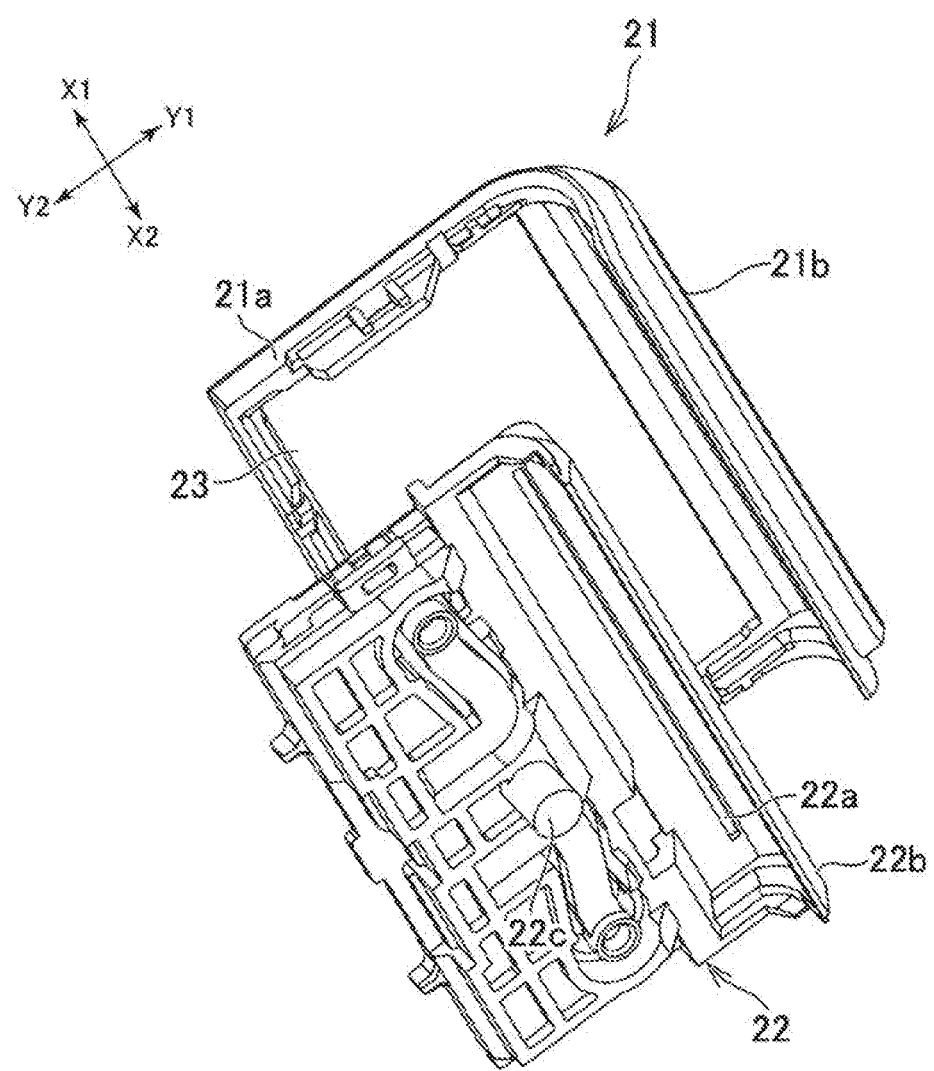
FIG. 4 is an exploded perspective view of a light-transmitting panel and a button frame illustrated in FIG. 3.
Figure 5:
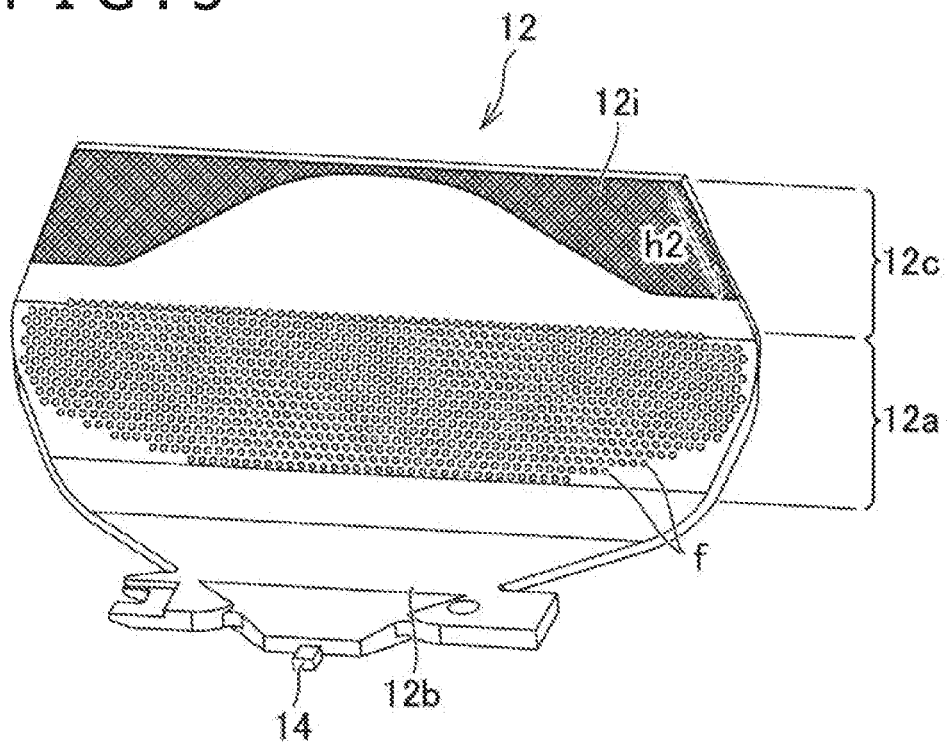
FIG. 5 is a perspective view of a light guide member illustrated in FIG. 3.

A description will be given below of an embodiment of the present disclosure. FIG. 1 is a plan view of an operating device 1 that is an example of an embodiment of the present disclosure. FIG. 2 is a front view of the operating device 1. FIG. 3 is a sectional view obtained by a cutting plane shown by line III-III illustrated in FIG. 1. FIG. 4 is an exploded perspective view of a light-transmitting panel 21 and a button frame 22 illustrated in FIG. 3. FIG. 5 is a perspective view of a light guide member 12.

In the description given below, X1, X2, Y1, and Y2 shown in FIG. 1 will be referred to as rightward direction, leftward direction, frontward direction, and backward direction, respectively. Also, Z1 and Z2 shown in FIG. 2 will be referred to as upward direction and downward direction, respectively.

The operating device 1 is used as an input device for an information processing apparatus having, for example, a game program execution function, a video playing function, and a communication function via the Internet. The operating device 1 is capable of wired or wireless communication with the information processing apparatus and sends, to the information processing apparatus, a signal that corresponds to the operation performed by the user on the operating device 1. The operating device 1 incorporates a variety of sensors (e.g., acceleration sensor or gyro sensor) that are employed to detect a posture and motion of the operating device 1, a battery, and so on.

As illustrated in FIG. 1, the operating device 1 includes a plurality of operating members on an upper surface of its right portion and an upper surface of its left portion. The operating device 1 includes buttons 41, directional keys 42, and so on as operating members. These operating members will be described in detail later. The operating device 1 includes a right grip GR and a left grip GL that extend backward on the right portion and the left portion thereof, respectively. The grips GR and GL are held by the user when the operating device 1 is used.

As illustrated in FIG. 1, the operating device 1 includes a middle portion M between the above-mentioned operating members of the right portion (buttons 41 in the example of the operating device 1) and the above-mentioned operating members of the left portion (directional keys 42 in the example of the operating device 1). A plate-shaped operating member 20 to be operated by the user is provided on the upper surface of the middle portion M. In the example of the operating device 1, the operating member 20 functions as a pushbutton. Also, a touch sensor 23 (refer to FIG. 3) is provided on the operating member 20. The operating member 20 will be also described in detail later.

As illustrated in FIG. 2, the operating device 1 includes a first light-emitting area E1 on a front surface of the middle portion M (the first light-emitting area E1 is shaded in FIG. 2). The operating device 1 causes the first light-emitting area E1 to emit light when the operating device 1 is used. An external information processing apparatus (e.g., game machine) acquires light of the first light-emitting area E1 through a camera and tracks the operating device 1 based on that light. For example, the information processing apparatus continuously detects the position of the operating device 1 based on the light of the first light-emitting area E1.

In the example of the operating device 1, the first light-emitting area E1 is a horizontally long and narrow area as illustrated in FIG. 2. That is, a horizontal width of the first light-emitting area E1 is greater than a vertical width of the first light-emitting area E1. Also, the first light-emitting area E1 is approximately triangular in the example of the operating device 1. Such a shape of the first light-emitting area E1 can enhance the accuracy with which the information processing apparatus recognizes the first light-emitting area E1. The shape of the first light-emitting area E1 is not limited to that in the example of the operating device 1. For example, the first light-emitting area E1 may be elliptical, rectangular, or in other shape.

As illustrated in FIG. 3, a front surface of the middle portion M points diagonally downward, and the first light-emitting area E1 emits light diagonally downward. The shape of the middle portion M is not limited to that in the example of the operating device 1. For example, the first light-emitting area E1 provided on the front surface of the middle portion M may be formed to be perpendicular. Alternatively, the first light-emitting area E1 may be curved in such a manner as to swell forward.

As illustrated in FIG. 3, the operating device 1 includes a first light-transmitting panel 11 that makes up the first light-emitting area E1. The first light-transmitting panel 11 is formed with a material that transmits light (e.g., acrylic resin). The first light-transmitting panel 11 may be a transparent material or a translucent material. For example, a material obtained by mixing a transparent material with a light diffusing agent is used as a material of the first light-transmitting panel 11. The operating device 1 includes a housing 13 that makes up an exterior of the operating device 1. An opening is formed in the front surface of the housing 13. The first light-transmitting panel 11 is fitted in this opening. The front surface of the first light-transmitting panel 11 is exposed forward through the opening of the housing 13. This exposed portion is the first light-emitting area E1.

As illustrated in FIG. 3, the operating device 1 includes an LED 14 that is a light source of the first light-emitting area E1. As will be described later, the LED 14 functions also as a light source of a second light-emitting area E2 (refer to FIG. 1) provided on an upper surface of the operating device 1. In the example of the operating device 1, the LED 14 is arranged in the back and away from the first light-transmitting panel 11. More specifically, the LED 14 is located at a lower portion of the housing 13 and is in the back and away from a lower portion of the first light-transmitting panel 11. Also, the LED 14 is in the back and away from a horizontal center of the first light-transmitting panel 11. The operating device 1 includes a circuit board 15 and a circuit board 16. A variety of integrated circuits and other components are mounted on the circuit board 15. The circuit board 16 is arranged under and away from the circuit board 15. The LED 14 is mounted on the circuit board 16. In the example of the operating device 1, a battery 17 is arranged between the circuit board 15 and the circuit board 16.

The position of the LED 14 is not limited to that in the example of the operating device 1. For example, the LED 14 may be mounted on the circuit board 15. Further, in another example, the LED 14 may be arranged in the back of an upper portion of the first light-transmitting panel 11. Also, the LED 14 may be arranged to be shifted to the right or to the left relative to the horizontal center of the first light-transmitting panel 11.

As illustrated in FIG. 3, the operating device 1 includes a light guide member 12 that guides light of the LED 14 to the first light-transmitting panel 11. In the example of the operating device 1, the light guide member 12 includes a plate-shaped base portion 12b (refer to FIG. 5) that extends forward from the LED 14. In the example of the operating device 1, the base portion 12b is approximately triangular, and the horizontal width of the base portion 12b gradually increases toward the front from the position of the LED 14 (incident surface).

As illustrated in FIG. 3, the light guide member 12 includes a first guide section 12a that is arranged behind the first light-transmitting panel 11. In the example of the operating device 1, the first guide section 12a is in the shape of a plate (refer to FIG. 5) and is arranged along a back surface of the first light-transmitting panel 11. The light guide member 12 is curved between the base portion 12b and the first guide section 12a, and the first guide section 12a extends diagonally upward from the base portion 12b.

Light of the LED 14 travels toward the first guide section 12a inside the light guide member 12 while being reflected by an outer surface of the light guide member 12. A structure that directs light forward is provided on a back surface of the first guide section 12a. For example, a roughened back surface or an uneven back surface is provided on the first guide section 12a. Light directed forward by the first guide section 12a exits from the first light-emitting area E1 through the first light-transmitting panel 11.

In the example of the operating device 1, the LED 14 is located in the back and away from the first light-transmitting panel 11. Therefore, an optical path from the LED 14 to the first light-transmitting panel 11 is long. As a result, it is possible to spread light of the LED 14 horizontally sufficiently, allowing for uniform light emission over the entire area of the first light-emitting area E1. Also, in the example of the operating device 1, the light guide member 12 is curved between the base portion 12b and the first guide section 12a, allowing for reflection of light inside the light guide member 12 a greater number of times. As a result, it is possible to spread light of the LED 14 horizontally even more efficiently. As illustrated in FIG. 3, in the example of the operating device 1, a reflecting member 19 that reflects light is provided behind the first guide section 12a. This ensures that light reaching the first guide section 12a is directed even more efficiently to the first light-transmitting panel 11.

As illustrated in FIG. 1, the operating device 1 includes, on its upper surface, the plate-shaped operating member 20. The operating member 20 is provided in the middle portion M. In the example of the operating device 1, the operating member 20 is supported in a vertically movable manner and functions as a pushbutton. The operating member 20 is in the shape of a rectangular plate. As will be described later, the operating member 20 also includes a touch sensor 23 (refer to FIG. 3) that detects a user's finger position on the operating member 20.

As illustrated in FIG. 3, the operating member 20 includes, on an outside surface (upper surface), a second light-transmitting panel 21. The second light-transmitting panel 21 is formed with a material that transmits light (e.g., acrylic resin). The second light-transmitting panel 21 includes a second light-emitting area E2 (refer to FIG. 1) that emits light using the LED 14 as a light source. This structure allows the user to find out whether or not the first light-emitting area E1 is emitting light by observing the second light-emitting area E2 when the operating device 1 is used. Also, if the LED 14 changes its color, the user can find out the color of the first light-emitting area E1 by observing the second light-emitting area E2.

In the example of the operating device 1, the second light-emitting area E2 is defined as part of the second light-transmitting panel 21. More specifically, the second light-emitting area E2 is defined as a front portion of the second light-transmitting panel 21 as illustrated in FIG. 1. Then, the second light-emitting area E2 is located above the above-mentioned first light-transmitting panel 11. In the example of the operating device 1, the second light-emitting area E2 is in a linear shape and extends horizontally. The shape or size of the second light-emitting area E2 is not limited to that in the example of the operating device 1. For example, the second light-emitting area E2 may be in the shape of a horizontally long and narrow ellipse, a rectangle, a curve, and so on as long as the size of the second light-emitting area E2 fits the width of the light guide member 12.

The light guide member 12 is configured to guide light of the LED 14 to the second light-transmitting panel 21. Specifically, as illustrated in FIG. 3, the light guide member 12 includes a second guide section 12c (refer to FIG. 5) that extends upward beyond a position of the first light-transmitting panel 11 toward the second light-transmitting panel 21. Going into more details, the second guide section 12c is located higher than an upper edge 11a of the first light-transmitting panel 11. Also, the second guide section 12c is located higher than the first light-emitting area E1. The second guide section 12c is located under the second light-emitting area E2. The distance between the second light-emitting area E2 (in other words, the second light-transmitting panel 21) and the light guide member 12 can be reduced by the second guide section 12c, making it possible to achieve high brightness of the second light-emitting area E2. The second guide section 12c extends further upward from the first guide section 12a that directs light to the first light-transmitting panel 11.

Part of the light reaching the first guide section 12a is directed to the first light-transmitting panel 11. The rest of the light reaching the first guide section 12a travels inside the second guide section 12c and exits from a tip surface 12d of the second guide section 12c toward the second light-transmitting panel 21 (the tip surface 12d will be referred to as a light emission surface below).

As illustrated in FIG. 3, the light emission surface 12d is located immediately under the second light-emitting area E2 in the example of the operating device 1. When the operating device 1 is seen in plan view, the light emission surface 12d thus overlaps the second light-emitting area E2. It should be noted that the second light-emitting area E2 is defined by an opening (slit) 22a formed in the button frame 22 which will be described later. Therefore, the light emission surface 12d is located immediately under the opening 22a.

As illustrated in FIG. 3, the second guide section 12c extends close to a lower surface of the second light-transmitting panel 21. Therefore, no other members exist between the light emission surface 12d and the lower surface of the second light-transmitting panel 21. In other words, a straight line L3 passing through the second light-emitting area E2 and the light emission surface 12d does not intersect other members between the second light-transmitting panel 21 and the light emission surface 12d. This structure makes it possible to achieve even higher brightness of the second light-emitting area E2. As described above, the operating member 20 is a vertically movable pushbutton. Therefore, a clearance that permits downward movement of the operating member 20 is defined between the light emission surface 12d and the lower surface of the second light-transmitting panel 21.

As illustrated in FIG. 3, the operating member 20 includes the button frame 22 that is attached to a lower side of the second light-transmitting panel 21. The horizontal width of the button frame 22 matches with the horizontal width of the second light-transmitting panel 21 (refer to FIG. 4). The above-mentioned circuit board 15 is arranged under the operating member 20. A switch 15a is mounted on the circuit board 15. A pressing section 22c for pressing the switch 15a is formed in the button frame 22. In the example of the operating device 1, the pressing section 22c protrudes downward from the button frame 22 toward the switch 15a.

The LED 14 is located lower than the circuit board 15. In the example of the operating device 1, the LED 14 is mounted on the circuit board 16 that is arranged under and away from the circuit board 15. The first light-transmitting panel 11 and the first guide section 12a are located lower than the circuit board 15. The second guide section 12c extends upward beyond a height of the circuit board 15.

As illustrated in FIG. 3, the operating member 20 includes the touch sensor 23. The touch sensor 23 outputs a signal that matches with the position (coordinates) of the user's finger that touched a front surface (upper surface) of the operating member 20. The touch sensor 23 is attached to the lower surface of the second light-transmitting panel 21 and is located between the second light-transmitting panel 21 and the button frame 22. The second light-transmitting panel 21 is larger in size than the touch sensor 23. In the example of the operating device 1, the above-mentioned second light-emitting area E2 is defined along an edge of the touch sensor 23. More specifically, the second light-emitting area E2 is defined along a front edge of the touch sensor 23. This structure makes it possible to guide the user the position of the front edge of the touch sensor 23 with the light of the second light-emitting area E2.

As illustrated in FIG. 3, the second light-transmitting panel 21 includes an upper surface portion 21a that makes up the upper surface of the operating device 1. Also, the second light-transmitting panel 21 includes a front surface portion 21b that makes up the front surface of the operating device 1. The second light-transmitting panel 21 is curved between the upper surface portion 21a and the front surface portion 21b. The button frame 22 is attached to the upper surface portion 21a of the second light-transmitting panel 21. The opening 22a is formed in the button frame 22. The second light-emitting area E2 is defined by the opening 22a. That is, light exiting from the light emission surface 12d of the light guide member 12 exits to an upper side through the opening 22a. In the example of the operating device 1, the opening 22a is formed along the front edge of the touch sensor 23. It should be noted that the button frame 22 is formed with an opaque material.

As illustrated in FIG. 3, the operating device 1 includes a light-shielding section 22b and a light-shielding section 31a inside the members making up the exterior of the operating device 1, and more specifically, the housing 13 and the second light-transmitting panel 21. The light-shielding section 22b and the light-shielding section 31a are located in the front of the second guide section 12c of the light guide member 12. This structure keeps to a minimum external leakage of light of the second guide section 12c. As a result, it is possible to keep to a minimum a decrease in accuracy with which the camera of the information processing apparatus (e.g., game machine) recognizes a captured image of the operating device 1.

Each of the light-shielding section 22b and the light-shielding section 31a is in the shape of a wall that extends horizontally. The horizontal width of each of the light-shielding section 22b and the light-shielding section 31a is greater than the horizontal width of the second guide section 12c. This effectively keeps to a minimum external leakage of light of the second guide section 12c. As illustrated in FIG. 3, the two light-shielding sections 22b and 31a are located in the front of the second guide section 12c in the example of the operating device 1. An overall vertical width of the two light-shielding sections 22b and 31a combined is greater than a vertical width of the second guide section 12c. That is, when the operating device 1 is seen in front view, the second guide section 12c as a whole is covered by the light-shielding sections 22b and 31a. As will be described later, the light-shielding section 22b is formed integrally with the button frame 22. The light-shielding section 31a is formed integrally with a main body frame 31. A lower portion of the light-shielding section 22b and an upper portion of a light-shielding section 31b overlap each other when the operating device 1 is seen in front view.

As described above, the second light-transmitting panel 21 includes the front surface portion 21b. As illustrated in FIG. 3, the second guide section 12c of the light guide member 12 is located in the back of the front surface portion 21b. The light-shielding section 22b is located between the second guide section 12c and the front surface portion 21b. As a result, it is possible to keep to a minimum forward leakage of light of the second guide section 12c through the front surface portion 21b using the light-shielding section 22b.

As illustrated in FIG. 4, the light-shielding section 22b is formed integrally with the button frame 22. As a result, it is possible to keep to a minimum an increase in parts count. As described above, the button frame 22 is attached to the lower side of the second light-transmitting panel 21. As illustrated in FIG. 3, the light-shielding section 22b is arranged along an inner surface (back surface) of the front surface portion 21b of the second light-transmitting panel 21. The light-shielding section 22b extends upward along the inner surface of the second light-transmitting panel 21 to reach the opening 22a that defines the second light-emitting area E2. This structure makes it possible to block light that exits diagonally upward and forward from the light emission surface 12d of the light guide member 12 through the front surface portion 21b with the button frame 22 (specifically, the light-shielding section 22b).

The housing 13 includes an opening at a position that matches with the position of the second light-transmitting panel 21. The second light-transmitting panel 21 is fitted in the opening of the housing 13. The operating member 20 is a vertically movable pushbutton. Therefore, a clearance is provided between an edge of the second light-transmitting panel 21 and an edge of the opening of the housing 13 to permit vertical movement of the operating member 20. More specifically, a clearance is provided between a lower edge 21c of the front surface portion 21b of the second light-transmitting panel 21 and a front edge 13a of the opening of the housing 13 as illustrated in FIG. 3. The light-shielding section 31a longitudinally overlaps the front edge 13a of the opening of the housing 13 and the lower edge 21c of the front surface portion 21b of the second light-transmitting panel 21 when the operating device 1 is seen in front view. This structure keeps to a minimum forward leakage of light of the second guide section 12c through the clearance between the second light-transmitting panel 21 and the housing 13.

As illustrated in FIG. 3, the circuit board 15 is attached to the main body frame 31. In the example of the operating device 1, the circuit board 15 is attached to a lower side of the main body frame 31. The main body frame 31 is also formed with an opaque material. In the example of the operating device 1, the light-shielding section 31a is formed integrally with the main body frame 31. As a result, it is possible to keep to a minimum an increase in parts count. The light-shielding section 31a may be formed integrally with the button frame 22 rather than as shown in the example of the operating device 1. That is, the light-shielding section 22b may extend downward in such a manner as to overlap the front edge 13a of the opening of the housing 13 and the lower edge 21c of the front surface portion 21b of the second light-transmitting panel 21. Conversely, the light-shielding section 31a may extend upward in such a manner as to overlap the front surface portion 21b of the second light-transmitting panel 21 when the operating device 1 is seen in front view.

In the example of the operating device 1, the main body frame 31 further includes the light-shielding section 31b that is located behind the second guide section 12c and that is arranged along the second guide section 12c. This structure keeps to a minimum leakage of light of the second guide section 12c from positions other than the second light-emitting area E2. For example, it is possible to keep to a minimum leakage of light from left and right edges of the second light-transmitting panel 21. In the example of the operating device 1, the light-shielding section 31b extends to the height of an upper end (light emission surface 12d) of the second guide section 12c. The horizontal width of the light-shielding section 31b is greater than the horizontal width of the second guide section 12c as are the light-shielding sections 22b and 31a. In the example of the operating device 1, the light-shielding section 31b on the back side and the light-shielding section 31a on the front side are connected to each other at their right edge and left edge.

As described above, the second light-transmitting panel 21 extends forward and downward and connects to the front surface portion 21b while at the same time being curved from the upper surface portion 21a. A front surface (upper surface) of the second light-transmitting panel 21 is inclined downward toward the front at the second light-emitting area E2. For this reason, light exiting from the light emission surface 12d of the light guide member 12 is refracted by the front surface (upper surface) of the second light-transmitting panel 21 and exits in a direction inclined backward relative to a perpendicular direction (vertical direction) as shown by a line L1 in FIG. 3. Therefore, light exiting upward and diagonally backward from the second light-emitting area E2 is brighter than light exiting upward and diagonally forward from the second light-emitting area E2. When holding the grips GR and GL of the operating device 1, the user often views the upper surface of the operating device 1 from diagonally behind the operating device 1. For this reason, the operating device 1 that exits light diagonally backward from the light emission surface 12d makes it easier for the user to view light of the second light-emitting area E2. On the other hand, it is possible to prevent the information processing apparatus from acquiring light of the second light-emitting area E2 through a camera.

It should be noted that the structure for causing light of the second light-emitting area E2 to exit diagonally backward is not limited to that in the example of the operating device 1. For example, the position of the opening 22a (refer to FIG. 3) of the button frame 22 that defines the second light-emitting area E2 may be shifted longitudinally relative to the light emission surface 12d. For example, the opening 22a of the button frame 22 may be shifted backward relative to the light emission surface 12d of the light guide member 12. Also in this case, light of the light emission surface 12d exits in a direction inclined backward relative to the perpendicular direction (vertical direction). That is, light exiting upward and diagonally backward from the second light-emitting area E2 is brighter than light exiting upward and diagonally forward from the second light-emitting area E2.

Figure 6:
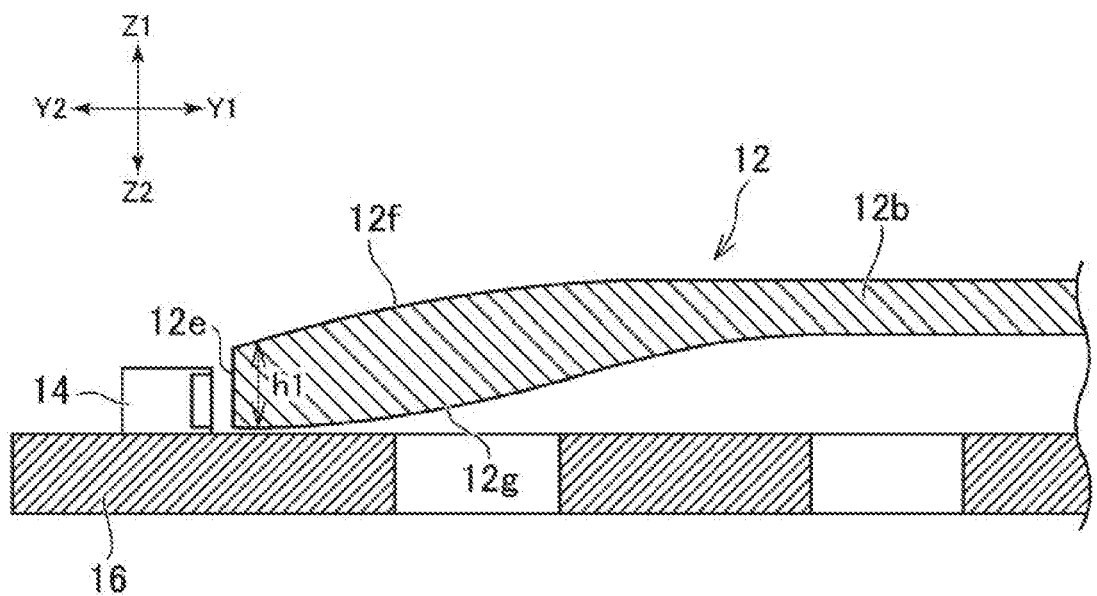
FIG. 6 is an enlarged view of FIG. 3 illustrating a base portion of the light guide member and a light-emitting diode (LED)

FIG. 6 is an enlarged view of FIG. 3 illustrating the base portion 12b of the light guide member 12 and the LED 14. In the example of the operating device 1, the LED 14 is located in the back of the base portion 12b of the light guide member 12. As illustrated in FIG. 6, a height h1 of an end surface (incident surface) 12e of the base portion 12b is greater than the height of the LED 14. This structure makes it easier for light of the LED 14 to enter the light guide member 12, contributing to higher light emission efficiency of the light-emitting area E1 and the light-emitting area E2. Also, an upper surface of the base portion 12b includes a curved surface 12f that is curved in such a manner as to swell upward on the side of the end surface 12e. This makes an incident angle of light on the upper surface of the base portion 12b small, keeping to a minimum exit of light from the upper surface of the base portion 12b. As a result, it is possible to allow the light-emitting areas E1 and E2 to emit light efficiently. In the example of the operating device 1, a lower surface of the base portion 12b also includes a curved surface 12g that is curved in such a manner as to swell downward on the side of the end surface 12e.

Figure 7:
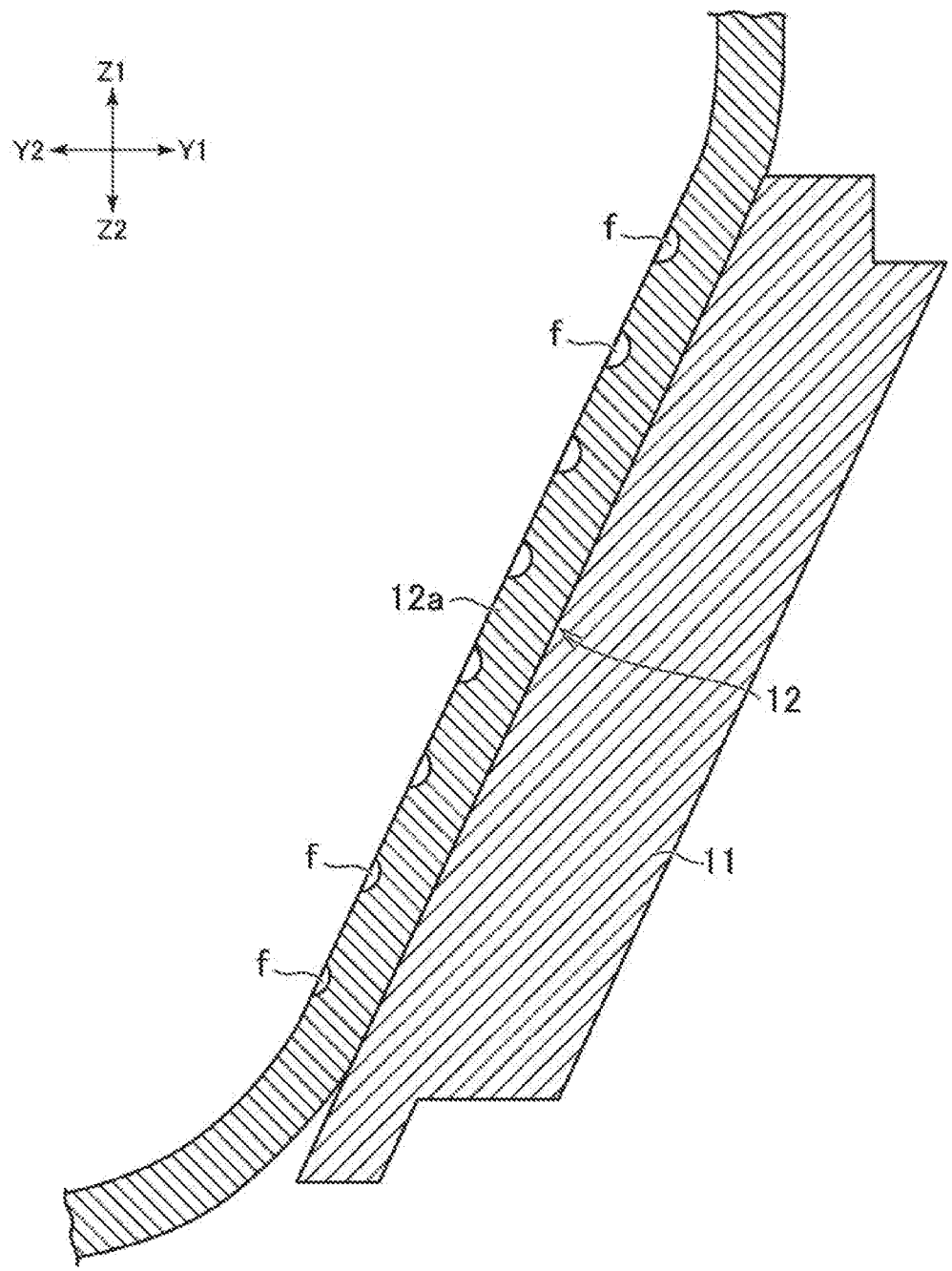
FIG. 7 is an enlarged view of FIG. 3 illustrating a first guide section of the light guide member.

FIG. 7 is an enlarged view of FIG. 3 illustrating the first guide section 12a of the light guide member 12. As illustrated in these figures, in the example of the operating device 1, a back surface of the first guide section 12a includes a plurality of concave portions f as a structure for directing light forward. An inner surface of each of the plurality of concave portions f is in a shape having a partial spherical surface. Light that travels inside the first guide section 12a strikes the concave portion f and changes its direction to forward. Also, the concave portions f close to a tip (upper end) of the first guide section 12a are deeper than the concave portions f close to the base portion 12b. In other words, the farther the concave portions f are from the LED 14, the deeper the concave portions f. This allows the first light-emitting area E1 as a whole to emit light efficiently.

As illustrated in FIG. 5, the light guide member 12 includes a light-diffusing section 12i on the side of the light emission surface 12d of the second guide section 12c (the light-diffusing section 12i is shaded in FIG. 5). Other part of the light guide member 12 is formed, for example, with a transparent material (e.g., acrylic resin). A diffusing agent (e.g., fine particles) that diffuses light is mixed with the light-diffusing section 12i. This structure makes it possible to change the brightness of the second light-emitting area E2 by the position. In the example of the operating device 1, the closer to a right end or a left end of the light guide member 12, the greater a height h2 of the light-diffusing section 12i. Therefore, it is possible to reduce the brightness of the second light-emitting area E2 so that the closer to a right end or a left end of the second light-emitting area E2, the lower the brightness of the second light-emitting area E2. A shape of the light-diffusing section 12i is not limited to that in the example of the operating device 1 and may be changed as appropriate.

The light guide member 12 can be formed, for example, by double molding which is a technique where two kinds of materials are formed integrally. The light-diffusing section 12i may be formed separately from the light guide member 12. For example, the light-diffusing section 12i may be formed separately from the light guide member 12 and be attached to the button frame 22. In this case, the light emission surface 12d of the light guide member 12 may be curved in the form of an arc such that positions of the right end and the left end are low.

A description will be given of buttons and so on provided on the operating device 1. As illustrated in FIG. 1, the operating device 1 includes, on an upper surface of its right portion, the plurality of operating buttons 41. In the example of the operating device 1, the four operating buttons 41 are provided on the upper surface, and these buttons are each provided at one end portion of a cross. The operating device 1 includes, on an upper surface of its left portion, the cross-shaped directional keys 42. Also, the operating device 1 includes a left operating stick 43 and a right operating stick 43 on a back portion of the middle portion M. The operating sticks 43 can be, for example, tilted radially or rotated while being tilted. The operating sticks 43 may be radially slidable. As illustrated in FIG. 2, an operating button 44 and an operating button 45 are provided on a front surface of the right portion and on a front surface of the left portion of the operating device 1. The operating buttons 44 and 45 are arranged one above the other.

The present disclosure is not limited to the embodiment described above and can be modified in various ways. For example, the operating member 20 may not necessarily function as a pushbutton. That is, it may not be typically necessary for the operating member 20 to be supported in a vertically movable manner. In other example, the operating member 20 may not include the touch sensor 23.

The present disclosure contains subject matter related to that disclosed in Japanese Priority Patent Application JP 2016-137074 filed in the Japan Patent Office on Jul. 11, 2016, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An operating device comprising:
    a first light-emitting area provided on a front surface of the operating device;
    a first light-transmitting member that is formed with a material that transmits light and that makes up the first light-emitting area;
    a second light-emitting area provided on an upper surface of the operating device, where the front surface and the upper surface are transverse to one another;
    a second light-transmitting member that is formed with a material that transmits light and that makes up the second light-emitting area;
    a light source; and a light guide member adapted to guide light of the light source to the first light-transmitting member and the second light-transmitting member, wherein the light guide member includes a first guide section arranged behind the first light-transmitting member to guide light to the first light-transmitting member, and a second guide section that extends upward beyond a position of the first light-transmitting member toward the second light-transmitting member, and wherein light exiting upward and diagonally backward from the second light-emitting area is brighter than light exiting upward and diagonally forward from the second light-emitting area.

2. The operating device of claim 1, wherein
the second guide section includes a light emission surface adapted to exit light, and
when the operating device is seen in plan view, at least part of the light emission surface overlaps the second light-emitting area.

3. The operating device of claim 1, wherein
the second guide section includes a light emission surface adapted to exit light, and
there is no other member between the second light-transmitting member and the light emission surface.

4. The operating device of claim 1, wherein
the first light-transmitting member is located lower than a circuit board, and
the second guide section of the light guide member is located higher than the circuit board.

5. The operating device of claim 1, further comprising:
a housing; and
a light-shielding section arranged inside the housing and located in front of the second guide section of the light guide member.

6. The operating device of claim 5, wherein
the second light-transmitting member includes:
an upper surface portion that makes up the upper surface of the operating device; and
a front surface portion that makes up the front surface of the operating device, and the light-shielding section is located between the front surface portion of the second light-transmitting member and the second guide section of the light guide member.

7. The operating device of claim 5, wherein the light-shielding section is formed integrally with a member that is arranged on a lower side of the second light-transmitting member and in which an opening defining the second light-emitting area is formed.

8. The operating device of claim 5, further comprising:
a circuit board; and
a frame to which the circuit board is attached, wherein the light-shielding section is formed integrally with the frame.

9. The operating device of claim 5, wherein
a horizontal width of the light-shielding section is greater than a horizontal width of the second guide section.

10. The operating device of claim 1, further comprising:
a plate-shaped operating member adapted to function as a button,
wherein the second light-transmitting member makes up the operating member.

11. The operating device of claim 10, wherein
the operating member includes:
the second light-transmitting member; and
a member attached to a rear surface of the second light-transmitting member, and
an opening defining the second light-emitting area is formed in the member attached to the second light-transmitting member.

12. The operating device of claim 10, further comprising:
a housing, wherein
the housing includes an opening in which the second light-transmitting member is fitted inside,
a clearance is provided between an edge of the opening of the housing and an edge of the second light-transmitting member to permit movement of the second light-transmitting member, and
when the operating device is seen in front view, a light-shielding section overlaps the edge of the opening of the housing and the edge of the second light-transmitting member.

* * * * *